(12) United States Patent
Dieterle et al.

(10) Patent No.: US 6,496,786 B1
(45) Date of Patent: Dec. 17, 2002

(54) METHOD AND APPARATUS FOR MEASURING A FREQUENCY DATUM

(75) Inventors: Roland Dieterle, St. Georgen (DE); Hermann Rappenecker, Vöhrenbach (DE); Alexander Hahn, Boll (DE)

(73) Assignee: Papst-Motoren GmbH & Co. KG, St. Georgen (DE)

(*) Notice: Subject to any disclaimer, the term of this patent is extended or adjusted under 35 U.S.C. 154(b) by 151 days.

(21) Appl. No.: 09/665,498

(22) Filed: Sep. 19, 2000

(30) Foreign Application Priority Data

Sep. 22, 1999 (DE) .......................... 199 45 313

(51) Int. Cl.[7] .............................. G01P 3/48; G01P 3/00
(52) U.S. Cl. .................. 702/145; 73/593; 324/166; 700/304; 702/147; 702/163
(58) Field of Search ................. 702/141, 142, 702/145, 146, 147, 163; 324/161, 166, 178, 207.18; 73/593; 700/304

(56) References Cited

U.S. PATENT DOCUMENTS

| | | | |
|---|---|---|---|
| 4,485,452 A | 11/1984 | Cording et al. | 702/147 |
| 4,569,027 A | 2/1986 | Nakano et al. | 702/147 |
| 4,754,220 A * | 6/1988 | Shimizu et al. | 324/207.18 |
| 4,800,508 A | 1/1989 | Frederich et al. | 700/304 |
| 4,912,661 A * | 3/1990 | Potter | 702/147 |
| 5,237,521 A | 8/1993 | Raj et al. | 702/163 |
| 5,445,028 A * | 8/1995 | Bianchi et al. | 73/593 |
| 5,502,376 A | 3/1996 | Busch et al. | 324/166 |
| 5,757,676 A | 5/1998 | Hobelsberger et al. | 702/145 |
| 5,994,893 A * | 11/1999 | Maruyama et al. | 324/144 |
| 6,037,765 A | 3/2000 | Sager et al. | 324/166 |

FOREIGN PATENT DOCUMENTS

| | | | |
|---|---|---|---|
| DE | 29 49 131 A1 | 6/1981 | |
| DE | 37 09 395 A1 | 9/1988 | |
| DE | 195 30 677 A1 | 2/1997 | |
| DE | 195 36 840 A1 | 4/1997 | |
| EP | 0 059 433 A1 | 9/1982 | |
| EP | 0 090 717 A1 | 10/1983 | |
| EP | 0 849 598 A1 | 11/1997 | |
| GB | 2 192 103 A | 12/1987 | 700/304 |

OTHER PUBLICATIONS

WPI English abstract of DE 37 09 395, Reiners/Licentia, publ. Sep. 29, 1988.
WPI English abstract of DE 29 49 131, Renner/Deuta–Werke, publ. Jun. 11, 1981.

* cited by examiner

Primary Examiner—John S. Hilten
Assistant Examiner—John Le
(74) Attorney, Agent, or Firm—Milton Oliver; Ware, Fressola, Van Der Sluys & Adolphson LLP

(57) ABSTRACT

An improved method, for obtaining a datum concerning the rotation speed (n) of a rotating object, such as a motor rotor (32), offers high precision. Typically, the motor has a sensor (61) which supplies a sensor signal that has, for each revolution of the rotor, a plurality A of events such as pulses or pulse edges which are counted by a microprocessor (23) associated with the motor. In order to keep the computation load on the microprocessor from increasing as the rotor speed increases, yet maintain high precision, the measurement is done over a full rotation of the rotor, starts at a first signal event (176), and ends after a third or nth signal event (182) which happens at the same rotational position as the first signal event.

26 Claims, 14 Drawing Sheets

METHOD AND APPARATUS FOR MEASURING A FREQUENCY DATUM

FIELD OF THE INVENTION

The invention relates to a method for measuring a frequency datum, in particular a rotation speed datum in the context of a motor, and to an apparatus for carrying out such a method.

BACKGROUND

Digital systems for sensing the rotation speed of a rotating object ("rotor") relate to the fact that such a rotor generates one or more signals with each revolution, e.g. needle pulses, pulse edges, or the like. These signals will be referred to hereinafter as "events." The sensing of a rotation speed datum is based on the fact that the time interval between "events" of this kind is measured, or that a count is made of the number of such "events" occurring per unit time.

Since the number of such "events" per unit time increases with increasing rotation speed, correspondingly more calculation time is required to process them in a digital system as the rotation speed rises, so that the calculation time available for other processes decreases.

SUMMARY OF THE INVENTION

It is an object of the invention to make available a new method for measuring a frequency datum, in particular a rotation speed datum in the context of a motor, and an apparatus for carrying out such a method.

According to a first aspect of the invention, this object is achieved by calculating interval length over a period of several events or instants. The result thereof is that the measurement of the rotation speed datum begins approximately at the first predefined instant, and an approximate measurement duration is defined by the first predefined instant and the third predefined instant. This approximate measurement duration is not influenced by the rotational velocity of the rotor. The initiation of the calculation of the rotation speed datum, which calculation can be accomplished after the measurement is complete, is thus also approximately determined in time. As a result, a microprocessor or microcontroller (hereinafter "$\mu C$") that, for example, is present is under a uniform load at all rotation speeds, so that sufficient calculation performance is always available for other tasks as well, e.g. controlling the rotation speed.

Because, in the course of a measurement, the "events" are sensed during one complete rotor rotation or a plurality of complete rotor rotations, an averaging occurs during measurement of the rotation speed datum. Specifically, if the rotation speed is ascertained by way of a plurality of short measurements, e.g. by measuring during part of a revolution, it is then usually necessary to create a moving average by calculation from multiple measured values. With the invention, on the other hand, an average is obtained without additional calculation, thereby additionally relieving the load on, for example, a $\mu C$. And despite the approximate definition of a measurement duration by way of the defined instants, with the method the actual measurement takes place precisely between two events of the sensor signal which are associated with the same rotational position of the rotor, i.e. the rotation speed datum is measured during complete revolutions. This is of interest particularly in the case of rotors which have, in order to generate the sensor at signal, multiple marks at differing angular distances. Thus in the case of a defined measurement, measurement occurs at the same mark, i.e. at the same rotational position of the rotor, so that any differences in angular distance play no part. This results in a highly accurate rotation speed measurement.

Another advantageous embodiment of the invention is when the 3rd instant of one measurement is also the 1st instant of a subsequent measurement. A method of this kind continuously measures a rotation speed datum, since the subsequent measurement follows the instantaneous measurement without interruption. In the vicinity of each defined instant, an instantaneous measurement is terminated and a new measurement is begun. If the predefined instants each occur after a time interval $T_{13}$ A, then on average a measurement takes place in each case after the time $T_{13}$ A. Processing of the measurement, for example in a $\mu C$, can thus take place at regular intervals that are independent of the rotation speed. As a result, the load on the $\mu C$ is uniform at all rotation speeds, so that sufficient calculation time is left over for other tasks, e.g. for commutating an electronically commutated motor or for rotation speed control.

Since in this case there is no pause between the individual measurements, this method is particularly suitable if each individual revolution of the rotor must be taken into account for the measurement, as is necessary, for example, with motors having high-precision controllers or with stepping motors.

The invention further concerns a method in which the remainder from a first measurement calculation is taken into account when making a subsequent measurement calculation. The result of taking into account, according to the present invention, the remainder in the subsequent measurement is, when the rotation speed is calculated by division, that no rotation speed information is lost by rounding. This results very advantageously in an increase in measurement accuracy, and is highly advantageous in the context of complicated control operations which demand high precision.

The refinement at which successive measurements, made at the same rotor position, are compared has proven extraordinarily advantageous in this context, since a method of this kind is particularly tolerant of interference pulses. An interference pulse does cause an error in the instantaneous measurement, but the subsequent measurements are once again correct, although they use a different rotor position than before to sense the measurement duration.

An apparatus which includes a programmed-controlled device for processing the signals and making the time interval calculations also allows the aforesaid object to be achieved.

The preferred use of a ring counter has the advantage that the stopping point of the one measurement and the starting point of the next measurement are simultaneous because the ring counter is always running, so that no errors can occur due to measurement delay, and any delays resulting, for example, from the simultaneous occurrence of two interrupts are subsequently automatically compensated for. This makes possible both uninterrupted sensing of the rotation speed and an average error in the rotation speed sensing equal to zero, since no bits are lost during the measurement.

Further details and advantageous developments of the invention are evident from the exemplary embodiments described below and depicted in the drawings, which are in no way to be understood as a limitation of the invention.

BRIEF FIGURE DESCRIPTION

FIG. 1 schematically illustrates a measurement according to the present invention for a rotor having a single mark 80;

Figure 3:
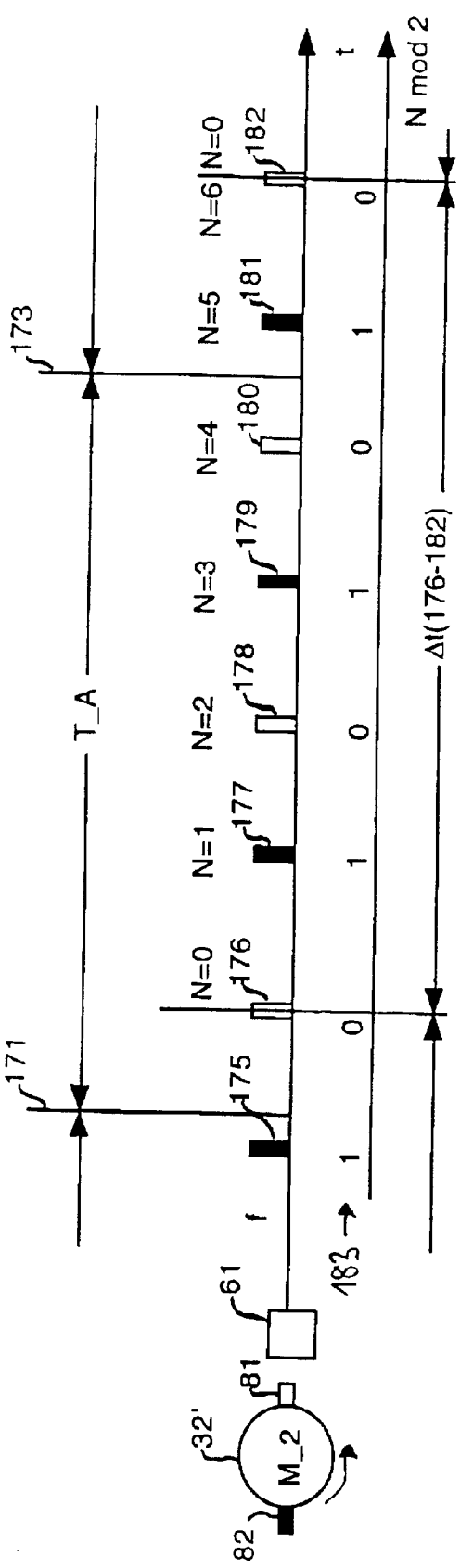
FIG. 3 shows a schematic depiction of a measurement according to the present invention for a rotor having two marks 81 and 82.
Figure 14:
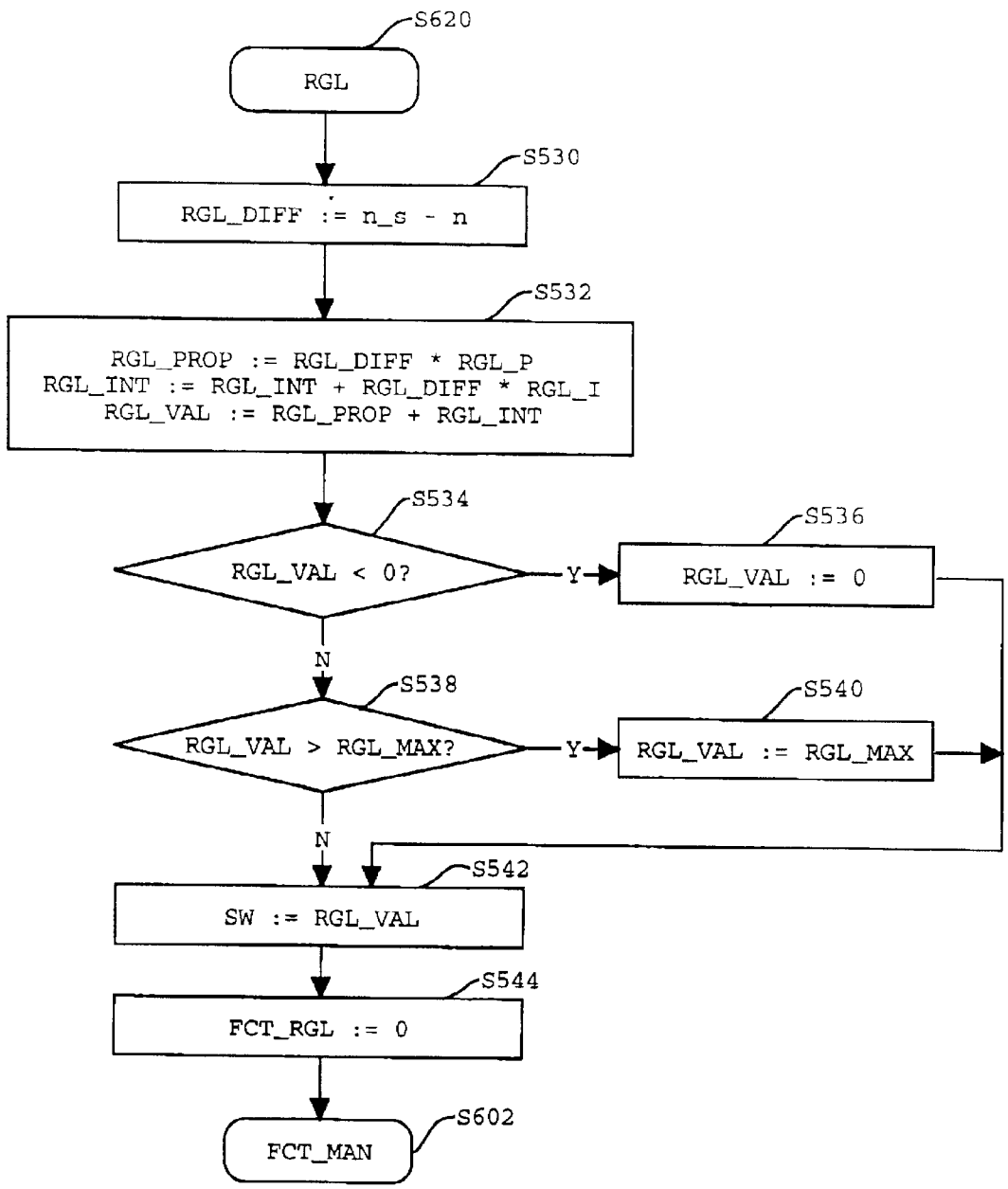
Figure 15:
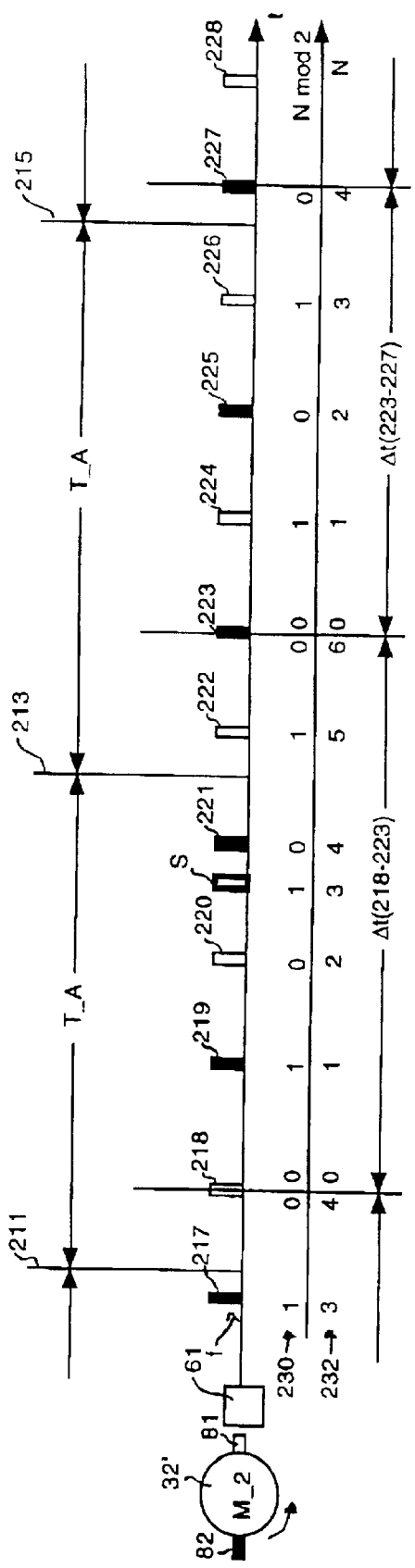

FIG. 14 shows a flow chart for a RGL function for controlling the rotation speed; and FIG. 15 shows a schematic diagram of a measurement analogous to that of FIG. 3 in which an interference signal S occurs, to explain the operations occurring in that context. Identical or functionally identical parts, appearing in different figures or embodiments, are hereinafter labeled with the same reference characters and are usually described only once.

DETAILED DESCRIPTION

Measurement principle

Figure 1:
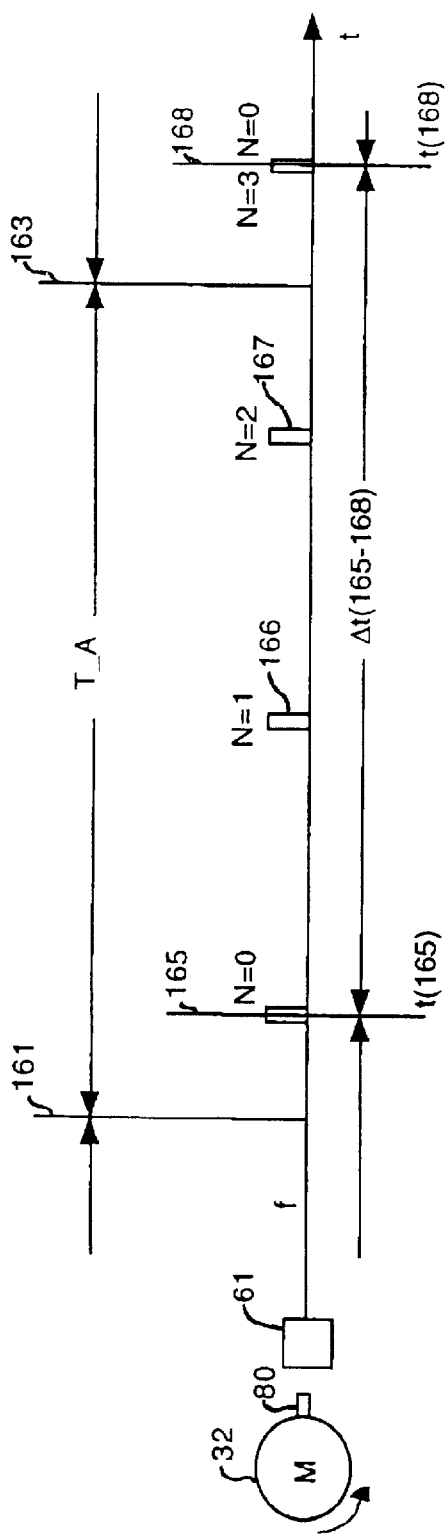

FIG. 1 shows a rotor 32 having a mark 80, and a sensor 61 for mark 80 which serves as a rotor position sensor. Rotor 32 is usually part of a motor M. If the motor is electronically commutated (ECM), it usually has a rotor position sensor 61 that can then also be used for the present invention. Mark 80 is depicted only symbolically and only for didactic purposes, and can be, for example, a specific magnetic marking of rotor 32 that is sensed by a Hall sensor. In that case mark 80 is not visible to the eye. Mark 80 could also, however, be an optical marking, or a cam that actuates a mechanical switch. In most cases magnetic markings are used in an electric motor (cf. rotor 32" in FIG. 10).

With the aid of mark 80, sensor 61 detects a sensor signal f. The latter has pulses at points 165, 166, 167, 168, etc., one revolution of rotor 32 having taken place between each two pulses. The time axis is labeled t. These pulses represent "events" in the rotation of rotor 32. In FIG. 1, one event (i.e. 1 pulse) is generated for each complete rotor revolution.

The rotation speed of rotor 32 is measured, with the aid of rotor position signal f, as follows: At regular intervals $T_{13}$ A, a start signal 161, 163, etc. is generated, triggering a new measurement in each case.

The start signal at point 161 is followed by pulse 165, and the start signal at point 163 is followed by pulse 168. The measurement takes place between points 165 and 168. What is measured is the number N of pulses of rotor position signal f that occur after 165 up to and including 168 (i.e. in this case N=3), and the time Δt (165–168) required for those pulses. From this, the frequency of rotor position signal f and thus the rotation speed of rotor 32 can be determined. At each of points 165, 168 of the measurement, an old measurement is terminated and a new measurement is started. The procedure here is thus such that at the pulse which follows start signal 161, 163, an old measurement is terminated and simultaneously a new measurement is begun.

The number N of pulses can be measured, for example, by resetting the value N to zero at the end of each measurement, and then incrementing the value N by 1 at each pulse. Pulse 165 thus has the ordinal number N=0, pulse 166 the ordinal number N=1, etc.

The time Δt can be measured, for example, by taking the difference between the time at the start of the measurement, e.g. t(165) at point 165, and the time at the end of the measurement, e.g. t(168) at point 168.

For example, if t(165)=17.7 ms and t(168)=87.7 ms, then

Δt(165–168)=87.7−17.7=70 ms.

Start signals 161, 163, which occur at fixed intervals $T_{13}$ A, create a measurement window. The measurements do not, however, take place exactly in this measurement window, but rather are measured at a suitable point following the respective start signal at which a pulse ("event") of rotor position signal f occurs. In the case of a measurement at the instant of the respective start signal, the beginning and the end of the measurement would, in the majority of cases, occur at any point between two pulses of sensor signal f. This would result in an inaccuracy in the measurement. If one waits until the next pulse, however, then complete periods between the pulses are measured, resulting in a considerable increase in measurement accuracy.

Figure 2:
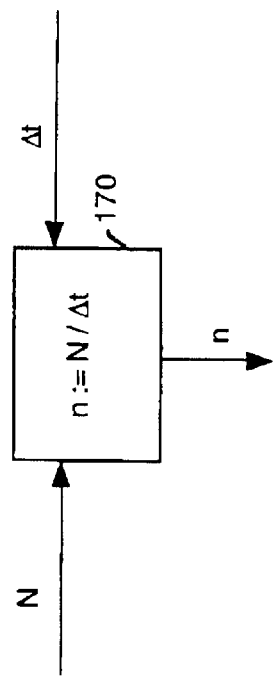
FIG. 2 shows a schematic depiction of a rotation speed calculation function.

FIG. 2 schematically shows a calculation of rotation speed n in a rotation speed calculation function 170. Function 170 receives as input, at time intervals whose average duration is $T_{13}$ A, the number N of pulses and the time Δt required for that number N. From this, function 170 calculates a rotation speed datum n as the quotient of number N and time Δt:

$$n = N/\Delta t \tag{1}$$

FIG. 3 shows rotor 32' (of a motor $M_{13}$ 2) having two marks 81 and 82 and rotor position sensor 61. Marks 81 and 82 are offset approximately 180° mech.

Rotor position sensor 61 detects a rotor position signal f with the aid of marks 81 and 82. Rotor position signal f has pulses as a result of mark 81 (shown in solid white) at points 176, 178, 180, 182, and pulses as a result of mark 82 (shown in solid black) at points 175, 177, 179, 181, etc. One complete revolution of rotor 32' takes place between each two "white" pulses and between each two "black" pulses.

Since no distinction can be made between the pulses of marks 81 and 82, it can be stated more generally that one revolution of rotor 32' takes place between each pulse and the next pulse but one, e.g. between N=1 and N=3.

The measurement of rotation speed n of rotor 32' is based on the following considerations:

Marks 81, 82 can never be arranged entirely symmetrically. For example, it is possible that mark 82 deviates a few degrees from the symmetrical position at 180° mechanical ("mech.") from mark 81 which lies at 0° mech., i.e. is positioned, for example, at 183° mech. This would result, in the case of a measurement that starts, for example, at point 176 (mark 81) and ends at point 181 (mark 82), in a measurement error, since the measured angular range would not be an exact multiple of 180° mech.

To eliminate this problem, in FIG. 3 only complete revolutions are measured in each case, i.e. measurement always occurs between the same type of mark, and thus what is measured is always exactly a multiple of 360° mech. The measurement that begins at 176, namely after a start pulse 171, therefore ends not at point 181 but at point 182, which is the next point following a start pulse 173, at which, assuming the measurement has started at point 176, one complete revolution has occurred.

This condition can be described mathematically using the so MODULO (mod) function; for example $$N \bmod 2 = 0 \tag{2}$$

means that when the value N is divided by 2, the remainder is 0. Thus for example 0 mod 2=0, 1 mod 2=1, 2 mod 2=0, 3 mod 2=1, etc.

In FIG. 3, at 183 the value "N mod 2" appears beneath pulses 175 through 182, and a measurement ends/starts only, for example, when a measurement is requested by way of a start signal 171, 172 and the condition N mod 2=0 is also met.

Stated more generally, the value of N mod 2 at the starting point and stopping point of the measurement should be the same.

If the rotor has a number A of markers, then the condition of equation (2) is generally $$N \bmod A = 0 \text{ or}$$

$$N \bmod A = \text{const.} \tag{3}$$

The variable A will hereinafter be labeled $MOD_{13}$ f, and equation (3) is then stated as $$N \bmod MOD_{13} f = 0 \text{ or}$$

$$N \bmod MOD_{13} f = \text{const.} \tag{3a}$$

Selection of the first marker can be made either by way of a particular signal, or, for example, the first measured event (here 176) can arbitrarily be selected as the event having the ordinal number N=0. The explanation relating to FIG. 15 will clarify this even further.

In FIG. 3 the measurement thus occurs either, as depicted, is between "white" pulses or, as depicted on the right in FIG. 15, between "black" pulses. In the example of FIG. 3 the measurement is performed between pulses 176 and 182. Here N=6 pulses are counted, and the time interval between pulses 176 and 182 is ascertained and equals Δt (176–182). From these two values, a rotation speed datum n is then calculated using equation (1).

Let it be emphasized once again that in reality there are no "white" or "black" pulses, but that they are a didactic aid for explanation of the invention.

Figure 4:
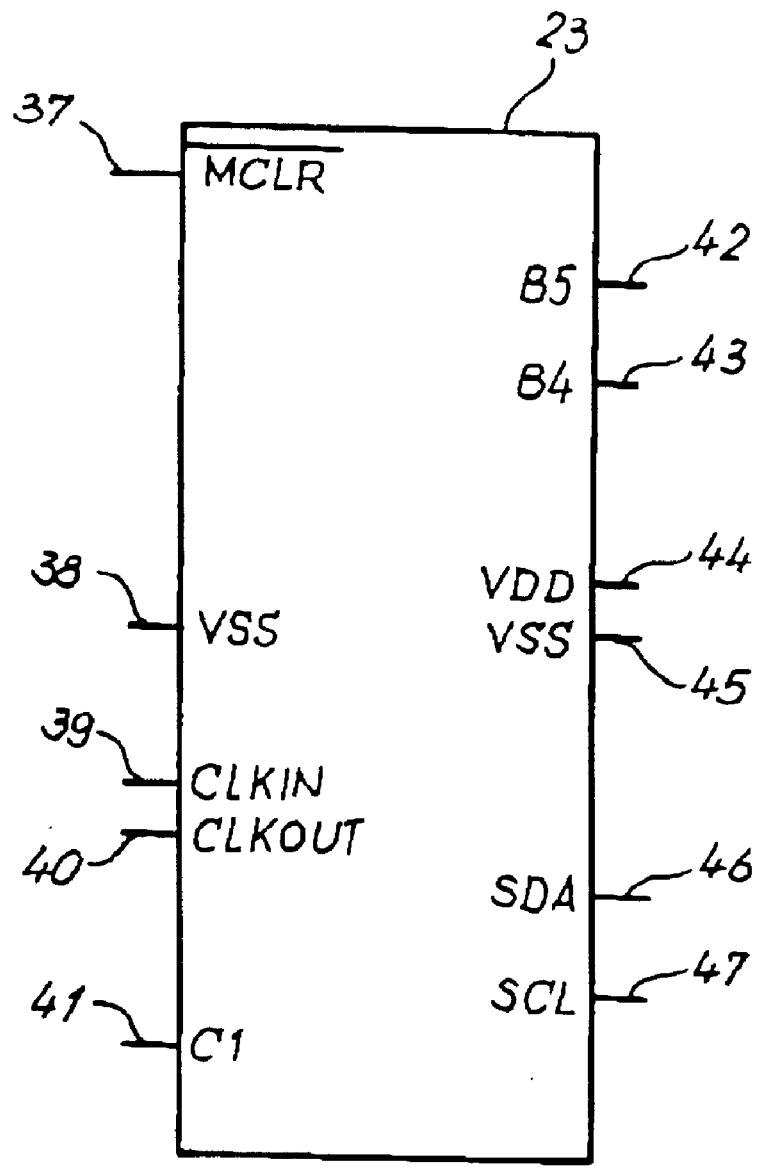
FIG. 4 shows the pin assignment of a μC used in the exemplary embodiment, specifically of the type PIC 16C72 from MICROCHIP.

FIG. 4 shows an overview of the terminals used for the exemplary embodiment of a μC 23, in this case of the type PIC 16C72 from the MICROCHIP company. This is an 8-bit processor. It contains a 16-bit timer and an 8-bit timer, two PWM (Pulse Width Modulation) registers, and several interrupt functions. Of course, this processor constitutes only one example, but it has proven successful in the embodiment described.

Among the terminals of μC 23 are MCLR 37, VSS 38, CLKIN 39, CLKOUT 40, Cl 41, B5 42, B4 43, VDD 44, VSS 45, SDA 46, and SCL 47.

Figure 5:
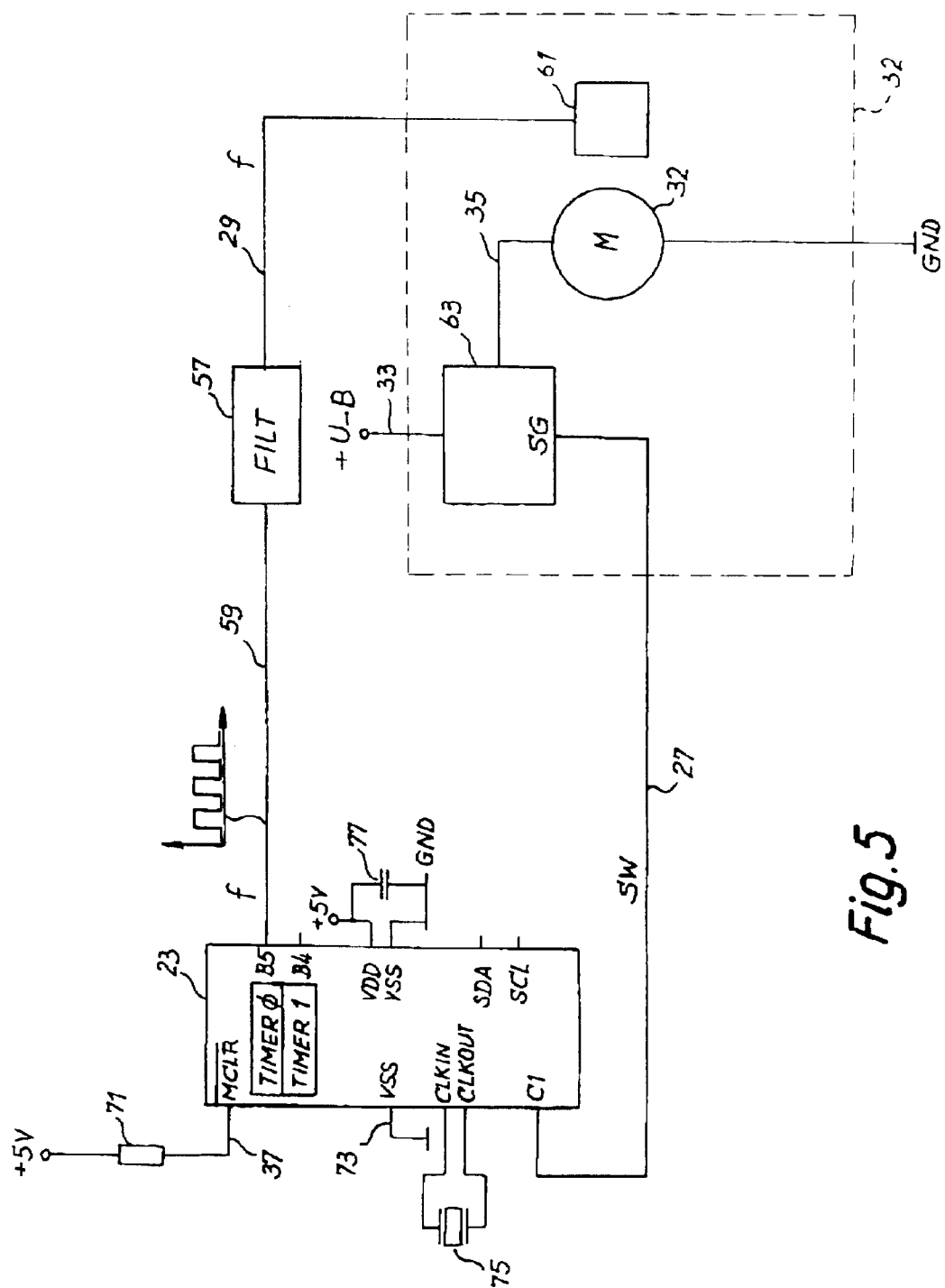
FIG. 5 shows a circuit diagram showing components of an arrangement according to the present invention.

FIG. 5 shows a circuit diagram of a preferred arrangement with an electric motor M whose rotation speed is to be regulated.

The terminals of μC 23 are depicted in FIG. 4, and the corresponding reference characters are again used. Terminal MCLR 37 is connected via a resistor 71 to a positive voltage +5V. Terminals CLKIN 39 and CLKOUT 40 are connected to a quartz oscillator 75 that generates the clock frequency for μC 23. Terminal VDD 44 is connected to +5V and terminal VSS 45 to ground GND, and a capacitor 77 is located between the two terminals. μC 23 has two timers TIMER0 and TIMER1, as well as a counter for variable INT_CNT_f described below. Parts that are identical or functionally identical to those in FIGS. 1 and 4 retain the same reference characters.

Frequency f detected by rotor position sensor 61 (corresponding to the rotation speed of motor M 32) passes via a line 29 to a filter FILT 57, and from there via line 59 to terminal B5 42 of μC 23.

Motor 32 has an actuator SG 63 which influences the magnitude of the current flowing through motor 32.

Actuator 63 is connected via a line 33 to a voltage +U_B, and a control output SW is conveyed to actuator SG 63 via a line 27 from terminal C1 of μC 23, in order to influence the magnitude of the current that flows via SG 63 to motor M.

Mode of Operation

μC 23 obtains its operating voltage via terminal VDD 44 at +5V and VSS 45 at ground GND. A filter capacitor 77 protects the supply voltage from voltage peaks and dips. Terminals SDA 46 and SCL 47 of MC 23 provide serial transmission of data and can be connected, for example, to an EEPROM or to an external bus (not depicted).

Frequency f is supplied by rotor position sensor 61, which supplies a constant number of pulses per revolution of rotor 32. A Hall generator or an optical, mechanical, capacitive, or inductive sensor can be used, for example, as rotor position sensor 61.

Figure 6:
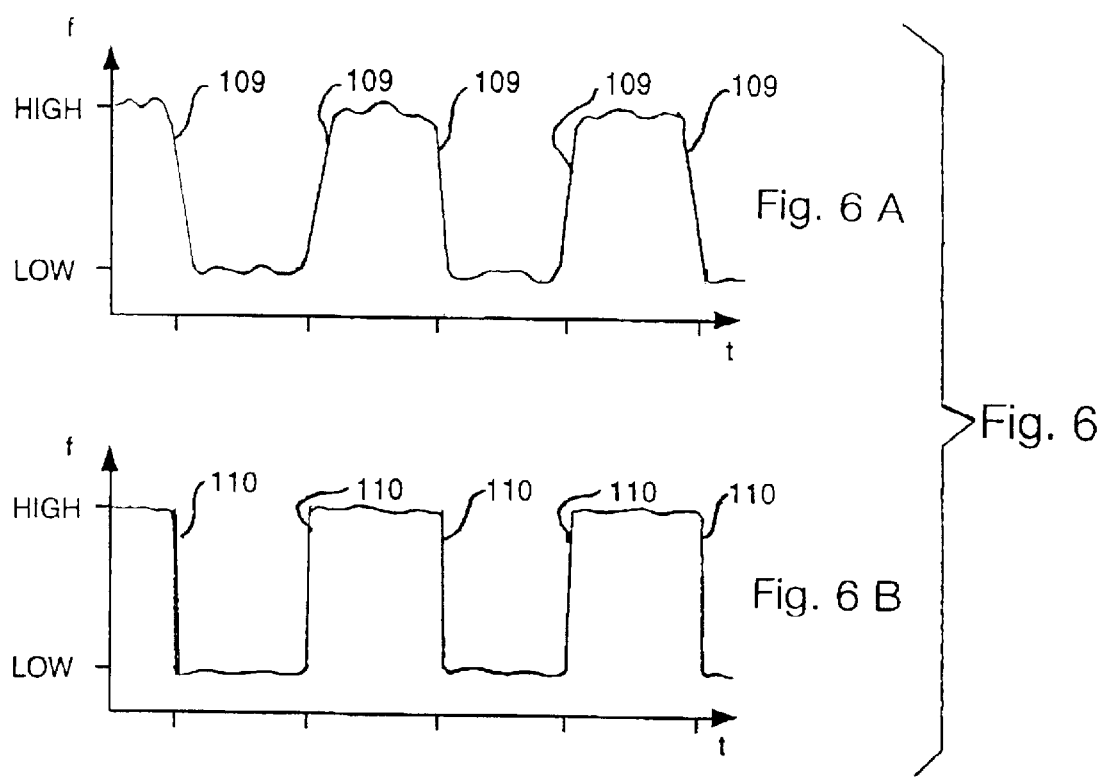
FIG. 6 shows an actual frequency f before and after signal processing.

Filter 57 serves to prepare the edges of frequency f so that when an edge change occurs, a Hall interrupt 630 (FIG. 7) is reliably triggered at interrupt-capable input B5 42. Filter 57 can be, for example, an RC element or a Schmitt trigger. If signal f from sensor 61 is suitable, filter FILT 57 can also be omitted. An example of the action of the filter is shown in FIG. 6.

TIMER0 of μC 23 is used to initiate start signals 171, 173 (FIG. 3) for the measurements, by initiating a TIMER0 interrupt 638 (FIG. 7) at the corresponding points 171, 173, etc.

TIMER1 of μC 23 is used to determine time difference Δt (FIG. 3). TIMER1 is preferably configured as a ring counter. This has the advantage that the ring counter runs continuously, and no bit is lost during a measurement. The result is therefore rotation speed sensing with very high resolution, operating on average with a zero measurement error. At each interrupt, the value of TIMER1 is read out and stored. A slight measurement delay may occur if two interrupts should ever occur simultaneously, but it will automatically be corrected in the following measurement cycle, since that cycle then automatically becomes slightly too short (because the stop point of the one measurement is identical to the start point of the next measurement) and the next measurement will be started before the current measured values have been analyzed.

A control output SW for the rotation speed control system, calculated in μC 23, is output via terminal C1 41, for example as an analog voltage SW, and is conveyed via line 27 to actuator SG 63 which controls the delivery of current for motor M 32. Actuator SG 63 can be implemented, for example, as an analog longitudinal controller or as a PWM actuator.

FIG. 6A shows frequency f before it enters filter FILT 57, and FIG. 6B shows frequency f after it has been processed in filter FILT 57. Frequency f in FIG. 6A derives, for example, from a Hall generator, and edges 109 are less steep.

Frequency f in FIG. 6B has been processed by filter 57. Edges 110 are steep, and in µC 23 each of the steep edges 110 can reliably trigger an interrupt 630 (FIG. 7) which hereinafter is called a Hall interrupt. The Hall interrupts correspond here to pulses 165 through 168 of FIG. 1, and 175 through 182 of FIG. 3.

General Configuration of the Overall Program; Function Manager

The architecture of the overall program that executes in µC 23 will be described below, followed by a detailed description of the individual subprograms.

Figure 7:
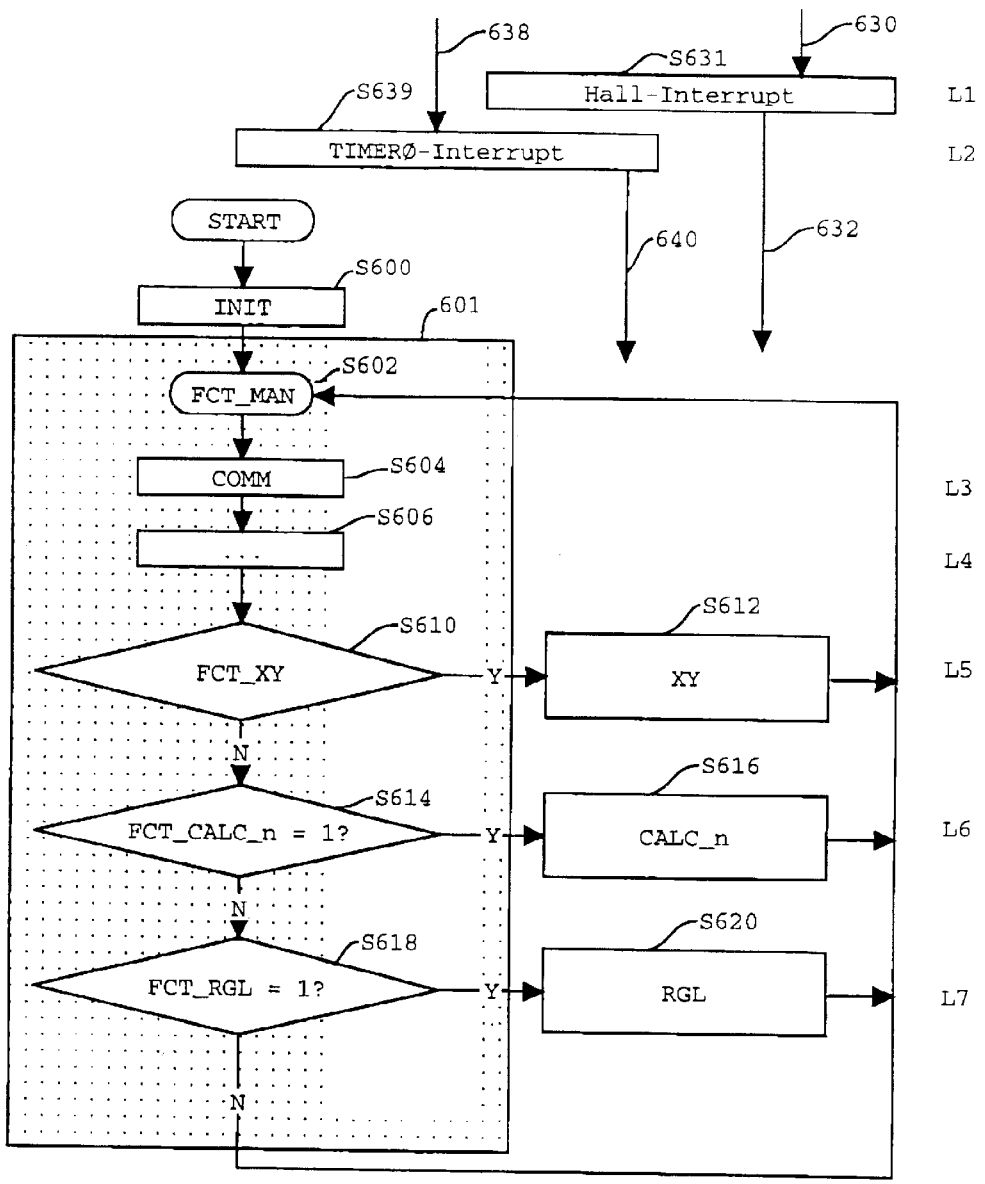
FIG. 7 shows a flow chart with an overview of the entire program.

FIG. 7 shows a flow chart with one possible embodiment of the overall program executing in µC 23.

Shown at the very top are two interrupt routines: Hall interrupt S631 (FIG. 12) and TIMER0 interrupt S639 (FIG. 11), which are executed when the respective interrupt 630, 638 occurs and which act on the main program via 632, 640. In this context, the priority, i.e. the sequence in which the individual program sections are executed, decreases from top to bottom. The priorities are therefore labeled L1 through L7 on the right-hand side, a smaller number denoting a higher priority. L1 thus has the highest priority.

Below the interrupt routines, the main program begins. After motor M has been switched on, an internal reset is triggered in µC 23. Initialization of µC 23 takes place in S600.

After initialization, execution branches into a so-called function manager 601, which begins in S602. Function manager FCT_MAN controls execution of the individual subprograms.

Those functions which are time-critical and which must be executed at each pass are processed first. These include, for example, a communication function COMM in S604 which performs data transfer between µC 23 and an EEPROM (not depicted) or bus (data line). S606 represents any further time-critical functions that may be present.

Figure 8:
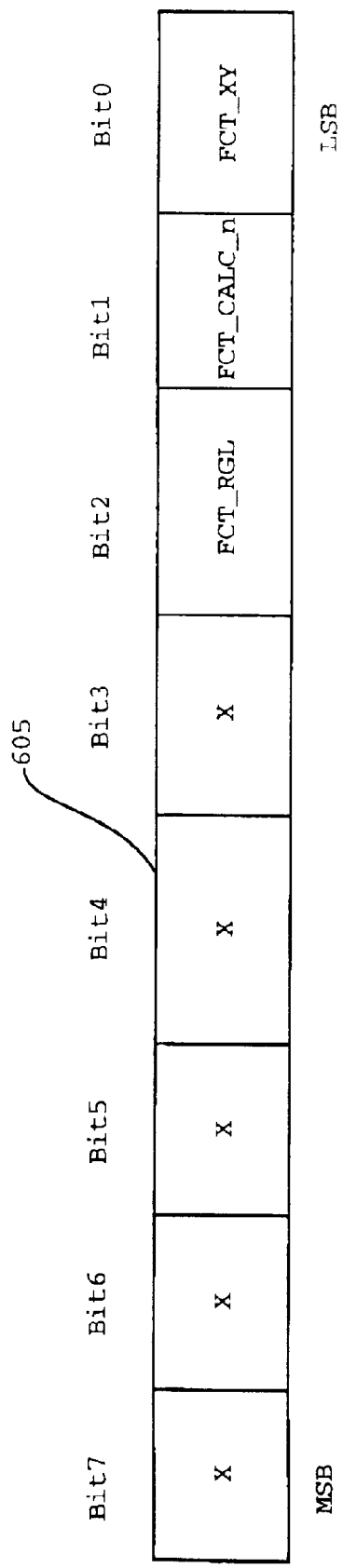
FIG. 8 shows a function register.

FIG. 8 shows, as an example, a function register 605 in which one bit is reserved for each function of FIG. 7.

In this exemplary embodiment, function register 605 is 1 byte long, and the following request bits for the requestable functions explained below are defined, beginning from the least significant bit (LSB):

FCT_XY for any function S612;

FCT_CALC$_{13}$ n for a rotation speed calculation function CALC$_{13}$ n S616;

FCT_RGL for a controller function RGL S620.

The remaining bits 3 through 7 are reserved for further requestable functions that may optionally be integrated into function manager 601.

Rotation speed calculation function CALC_n S616 (FIG. 7) serves to calculate the actual rotation speed n. Controller function RGL S620 (FIG. 14) calculates control output SW (FIG. 5) and outputs it to actuator SG 63 of motor M.

If a specific requestable function is to be requested by another function or by an interrupt routine, the bit of the requested function in function register 605 (FIG. 8) is set to 1, e.g. FCT_XY=1. The next time function manager 601 (FIG. 7) has not called any other higher-priority requestable function during a pass, the aforesaid function is executed.

Once a requested function has been processed, it sets its own request bit back to 0, i.e., for example, FCT_XY=0.

This allows longer functions, which cannot be processed in one pass (for example because they require too much time), to be split up and processed in multiple calls.

In FIG. 7, after S606 a check is made, in a predetermined sequence starting with the most important requestable function, as to whether its request bit is set. If that is the case for a function, that function is then executed and the program then branches back to the beginning FCT_MAN S602 of function manager 601. The sequence in which function register 605 is checked defines the prioritization of the requestable functions. The higher the location of such a function in function manager 601, the higher its priority.

Figure 13:
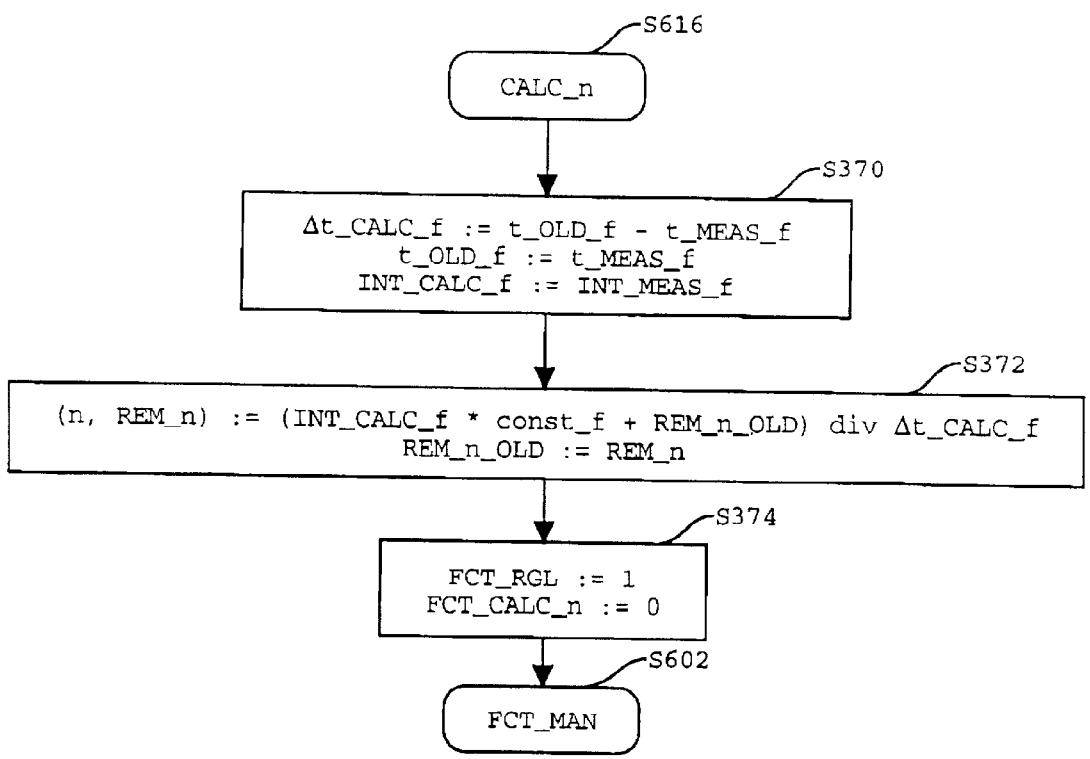
FIG. 13 shows a flow chart for a CALC$_{13}$ n function for calculating the rotation speed.

The manner of operation of function manager 601 will be explained with reference to an example. If the program branches, for example, from S610 to S614, then in S614 a check is made as to whether function register bit FCT_CALC_n=1, i.e. whether the rotation speed calculation function CALC_n S616 has been requested, as depicted in FIG. 13. If so, then execution branches to S616, and the rotation speed calculation function is performed. Upon termination, the rotation speed calculation function CALC$_{13}$ n S616 sets request bit FCT$_{13}$ CALC$_{13}$ n back to 0 (cf. S374 in FIG. 13), and execution branches back to the beginning S602 of function manager 601.

If a request bit was not set in any of the queries up to S618, then execution branches back, without an action, to S602; functions S604 and S606, which are executed each time function manager 601 is run through, are then processed again.

The function manager results in optimum utilization of the resources of µC 23.

Measuring Frequency f

Figure 9:
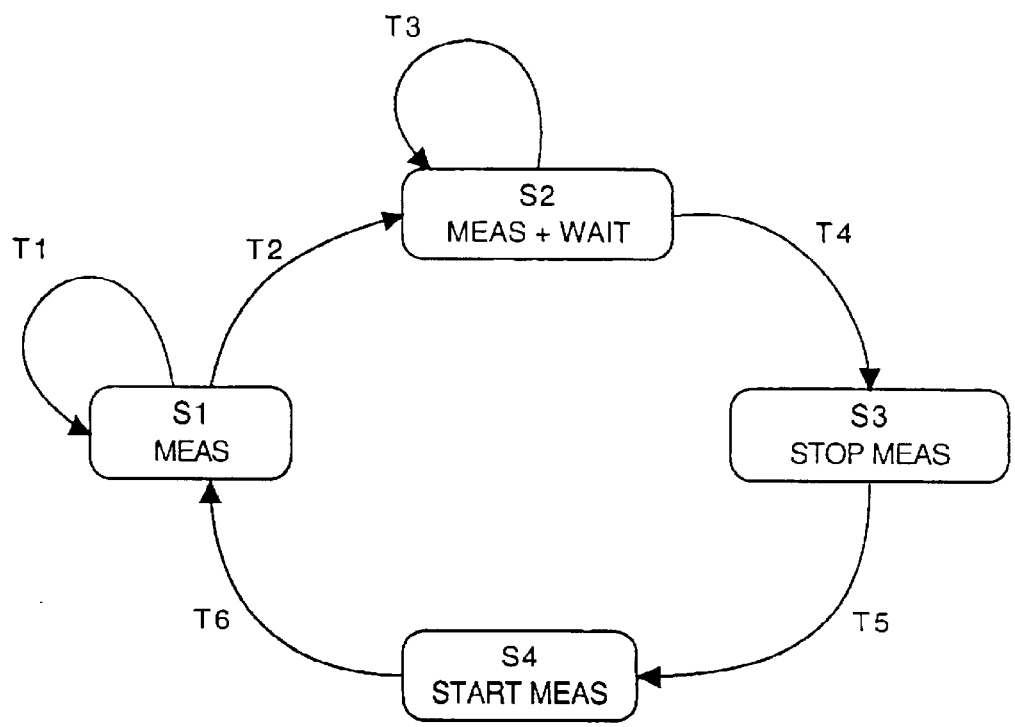
FIG. 9 shows a state diagram for a measurement method according to the present invention.

FIG. 9 shows a state diagram for measuring frequency. The state diagram has four states S1, S2, S3, and S4, and six transitions T1, T2, . . . , T6. Each transition is accompanied by an event and an action.

Table 1 below shows the associated event and action for each transition,

| Transition | Event | Action |
|---|---|---|
| T1 | Interrupt due to edge change in signal f | Read and store TIMER1, increment INT_CNT_f |
| T2 | Interrupt due to TIMER0 after time interval T_A | Enable frequency measurement |
| T3 | Interrupt due to edge change in signal f | Read and store TIMER1, increment INT_CNT_f |
| T4 | INT_CNT_f mod MOD_f = 0 | Calculate t_MEAS_f, INT_MEAS_f; start CALC_n |
| T5 | Instantaneous | None |
| T6 | Instantaneous | Prepare for new measurement |

The state diagram of FIG. 9 is explained with reference to FIG. 10.

FIG. 10A schematically shows a four-pole permanent-magnet rotor 32" and a rotor position sensor 61, which here is configured, for example, as a Hall sensor. Rotor 32" has two south poles (S) 35 and 35' and two north poles (N) 34 and 34'. Rotor position sensor 61 detects rotor position signal f, which exhibits an edge 110 each time the rotating rotor 32' moves from a north pole (N) to a south pole (S) and vice versa. At each edge 110 (FIGS. 6B and 10A) of signal f, a Hall interrupt 630 is triggered in μC 23 (FIG. 7). Four Hall interrupts 630 are thus triggered for each revolution of rotor 32".

FIGS. 10B and 10C show an associated diagram with an example of how the measurement of frequency f proceeds.

FIG. 10B shows TIMER0 interrupts 191, 193, 195 which are each triggered after a time interval T_A (e.g. TA=25 ms) by timer TIMER0 (in μC 23).

FIG. 10C shows frequency signal f which is detected by rotor position sensor 61. At each of points 197, 199, and 201, the two variables INT_MEAS_f (number of edge changes since the last measurement) and t_MEAS_f (instant of the present measurement) are forwarded to rotation speed calculation function CAL$_{13}$ Cn, which is explained below in FIG. 13.

The value INT_MEAS_f is determined with the aid of an edge counter INT_CNT_f (in μC 23), which is reset to zero each time a measurement starts and is incremented by 1 at each edge 110. The value INT_MEAS_f thus corresponds to variable N of FIG. 1 and FIG. 3, i.e. to the number of measured events 110.

t_MEAS_f is determined by way of TIMER1, which is preferably configured as a ring counter, making possible uninterrupted sensing of successive values of t_MEAS_f.

The numbers indicated in parentheses indicate the respective instant or time range to which the value in question applies. For example, at time 199 the value INT_MEAS_f(197–199) which contains the number of edges in the range from 197 to 199, and the value t_MEAS_f(199) which contains the instant of the measurement at 199, are transmitted to rotation speed calculation function CALC_n S616. For example, the value of INT_MEAS_f(197–199) is 8 because eight edges 110 have been counted.

FIG. 10D shows the value resulting from the calculation of INT_CNT_f mod 4. The MODULO calculation using N mod MOD_f was explained in the description of FIG. 3. In this exemplary embodiment the value N corresponds to the value INT_CNT_f, and the variable MOD_f was set to equal four, since rotor 32" is configured with four poles, meaning that a number A=4 events 110 occur with each revolution. As depicted in FIG. 10D, the value of INT_CNT_f mod 4 changes, at each edge 110 of signal f, in the sequence 0, 1, 2, 3, 0, 1, 2, . . . , as soon as the motor is switched on.

Frequency measurement will now be explained with reference to FIG. 9, the table in the description of FIG. 9, and FIG. 10.

At instant t=0 selected arbitrarily in FIGS. 10B and 10C, the frequency measurement depicted in FIG. 9 is in state S1.

Figure 12:
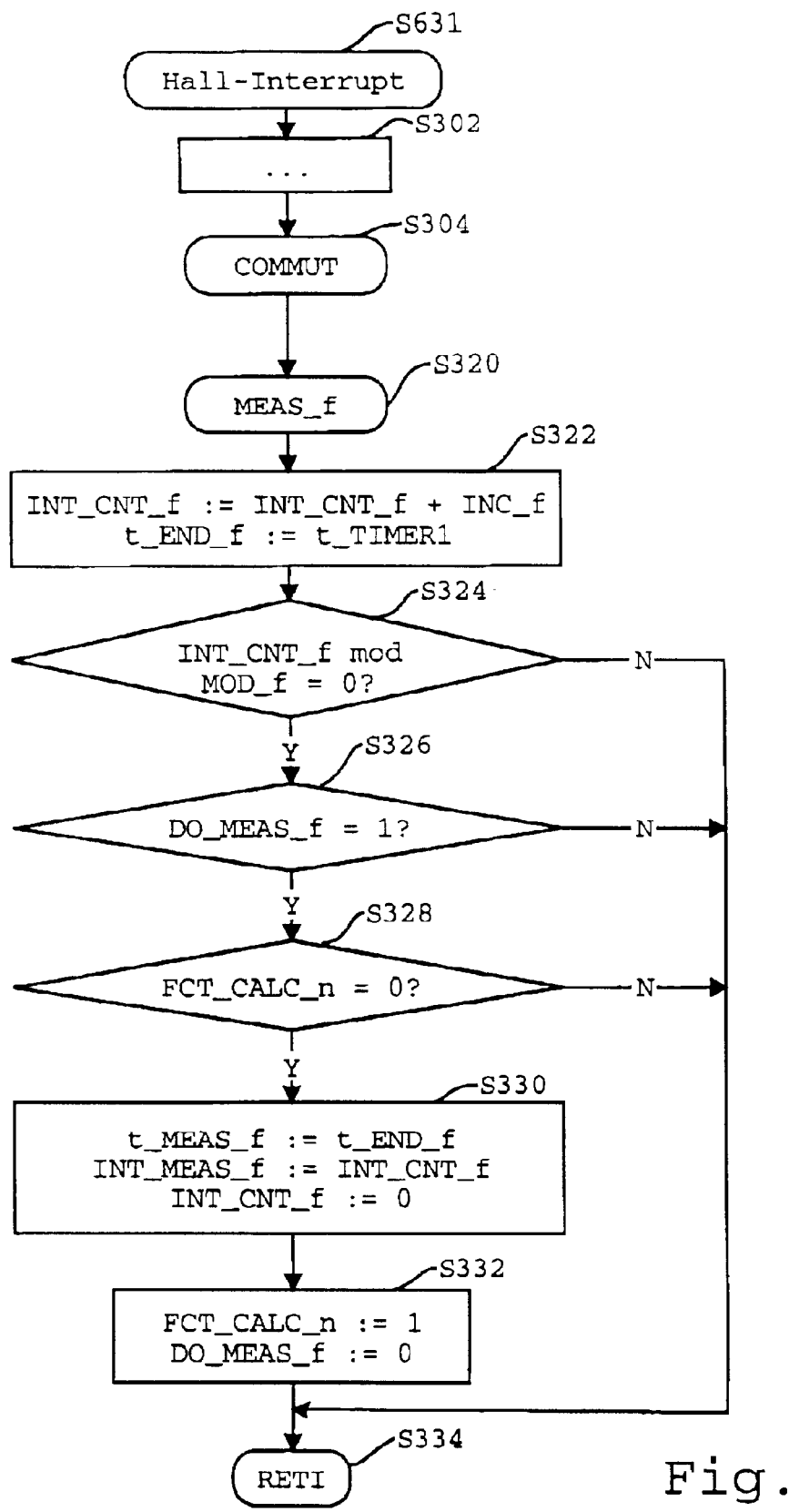
FIG. 12 shows a flow chart for a Hall interrupt function.

At each edge 110 (FIG. 10A) of f, a Hall interrupt 630 (FIG. 7) is triggered. This has the following results:

Hall interrupt routine S631 (FIG. 12) is initiated by Hall is interrupt 630;

in Hall interrupt routine S631, counter INT_CNT_f for the number of edges 110 is incremented by 1 (S322 in FIG. 12);

in Hall interrupt routine S631, the instantaneous value of ring counter TIMER1 is stored (S322 in FIG. 12).

In the state diagram (FIG. 9), this is depicted as transition T1 from state S1 to S1. The event here is a Hall interrupt 630 triggered by an edge 110, and the action consists in the counting of edge 110 in edge counter INT_CNT_f and storage of the instantaneous value of ring counter TIMER1.

Another event triggers transition T2 from state S1 to state S2. The event is the occurrence of a TIMER0 interrupt initiated by timer TIMER0. Timer TIMER0 initiates a TIMER0 interrupt 638 at predefined intervals T_A (FIGS. 1, 3, 10B), e.g. at points 191, 193, 195. In the associated TIMER0 interrupt routine S639 (FIGS. 7 and 11), frequency measurement is enabled. Timer TIMER0 thus defines successive windows with a width T_A.

The actual measurement of INT_MEAS_f and t_MEAS f is intended to take place from state S2.

Figure 10:
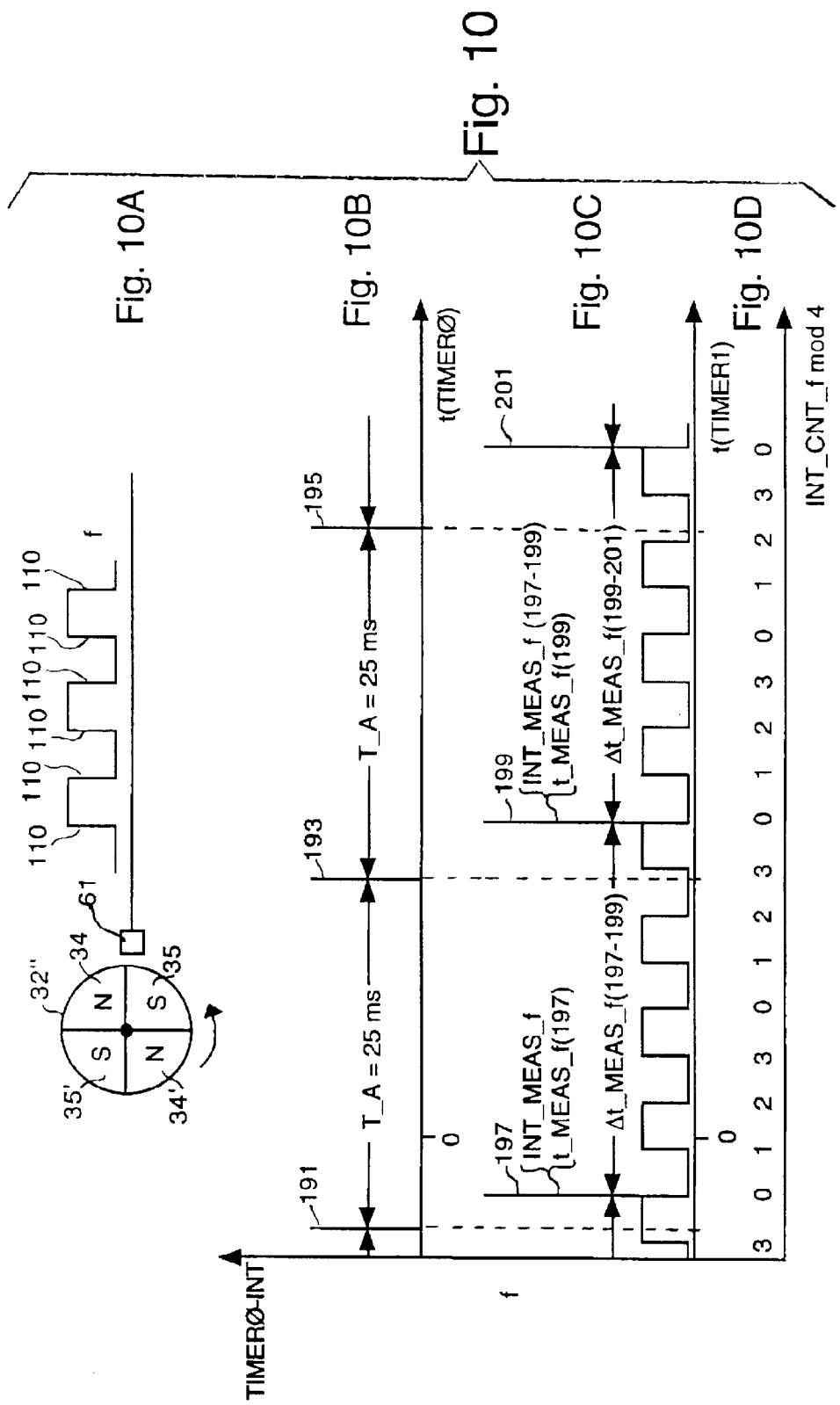
FIG. 10 shows a schematic diagram of a measurement according to FIG. 9 for a rotor having four marks.

As FIG. 10 shows, the respective measurement does not take place exactly at instants 191, 193, and 195 of the request, but rather at a suitable instant that is usually somewhat later.

In state S2, edges 110 of signal f continue to be sensed, and at each edge 110 a transition T3 (analogous to T1) occurs from S2 to S2, in which the instantaneous value of ring counter TIMER1 is read out and stored, and edge counter INT_CNT_f is incremented.

Final measurement of the values INT_MEAS_f and t_MEAS_f requires that one further condition be met. As explained in the description of FIG. 3, the marks that are applied to rotor 32", i.e. in this case the changes in magnetization from north to south, are not always arranged symmetrically on rotor 32". It is therefore advantageous always to measure at the same mark, thus ensuring that measurement occurs at the same point on rotor 32".

The number of edges 110 of signal f is counted in the variable INT_CNT_f; as defined by equation (3), the condition that (in the case of a four-pole rotor) measurement always occurs at a multiple of complete revolutions is achieved with $$INT\_CNT\_f \bmod 4 = 0 \qquad (4)$$

or alternatively with $$INT\_CNT\_f \bmod 8 = 0;$$

in the latter case, measurement always occurs at the earliest after two complete revolutions or a multiple thereof. If INT_CNT_f mod 12=0, measurement occurs at the earliest after three complete revolutions, etc. This would, however, degrade the dynamics of a controller.

With a measurement at the earliest after one complete revolution, the variable INT_CNT_f mod 4 therefore must have the same value at each measurement. Usually this will be a value of zero, since then with a six-pole rotor measurement can be performed using mod 6 (or mod 12), with a four-pole rotor using mod 4 (or mod 8), and with a two-pole rotor using mod 2 or mod 4, so that only the corresponding parameters 12, 8, 6, 4, or 2 need to be entered into μC 23 in order to readjust it for a different motor.

FIG. 10D indicates the result of INT_CNT_f mod 4 for the respective edge. After the measurement is requested at point 193, for example, edge 199, which is the eighth edge after point 197, is then the first edge at which the condition INT_CNT_f mod 4=0 of equation (4) is met (8 mod 4=0), and a measurement therefore takes place at point 199.

Thus if the number of edges is a multiple of MOD_f, in this case MOD_f=4, then in FIG. 9 a transition T4 takes place from S2 to S3, the number of edges sensed since the last measurement (which is stored in INT_CNT_f) is stored in INT_MEAS_f (S330 in FIG. 12), and the instant of the present measurement is stored in t_MEAS_f (S330 in FIG. 12). The values INT_MEAS_f and t_MEAS_f are then transferred to the rotation speed calculation function CALC_n S616, as depicted in FIG. 13 (cf. S370 therein).

From the present value t_MEAS_f(199) and the stored value t_MEAS_f(197) of the last measurement, it is possible to determine the time Δt_MEAS_f(197–199) that was required for the edges counted in the variable INT_MEAS_f(197–199).

An alternative possibility for determining the time Δt_MEAS_f is to reset the time to zero each time a measurement begins. This can be done, for example, by setting timer TIMER1 to zero. At the end of the measurement, the time in TIMER1 corresponds to the value Δt_MEAS_f. INT_MEAS_f and Δt_MEAS_f (cf. FIG. 2) are thus directly present at points 197, 199, and 201. A disadvantage of resetting timer TIMER1 is the fact that it then cannot readily be used simultaneously for other measurements.

From state S3 (FIG. 9), in which the last measurement is completed, an instantaneous transition T5 leads to state S4 in which a new measurement begins.

From state S4, an instantaneous transition T6 leads to state S1, and the frequency measurement is once again in its initial state S1. During T6, the next measurement is prepared. For example, counter INT_CNT_f (for the number of edges 110) is reset to zero (S330 in FIG. 12).

The measurement process as described in FIGS. 9 and 10 has several advantages.

With interrupt-based measurements, what is generally done in order to determine the rotation speed is to measure, either at each interrupt or after a fixed number of interrupts, the time since the previous interrupt, and from that to calculate the rotation speed. As a result, an increase in rotation speed means that new measured values arrive more and more often and must be processed. At very high rotation speeds this would result in an overload of μC 23 and a failure to account for individual measured values.

With the present measurement method, a new measurement is initiated in each case at predefined intervals T_A. μC 23 is thus under the same load at all rotation speeds or frequencies.

The present method furthermore has the advantage that when signal f is measured, measurement occurs at least until the next interrupt. Measurement thus does not occur at simply any instant, for example in between two edges 110, but rather measurement always takes place from edge to edge, i.e. from event to event, which considerably increases measurement accuracy (cf. FIG. 10).

A further increase in accuracy is achieved by measuring a multiple of MOD_f edge changes in each case, since this eliminates, for example, measurement errors caused by magnetization faults in a permanent-magnet rotor or by symmetry errors in an externally delivered frequency. This means, for example in the case of a four-pole motor, that a measurement is performed at the earliest at the fourth, eighth, 12th, etc. edge change, in other words whenever INT_CNT_f mod 4=0. (In a four-pole motor, four edges 110 are generated per revolution.)

For this type of measurement with a rotor position signal f having a fixed number A of events (pulses in FIG. 3, edges 110 in FIG. 10A) per revolution of rotor 32", MOD_f is set to equal that fixed number A, so that measurement occurs, after one complete revolution in each case, at the same position of rotor 32". Measurement thus always occurs at the event which is generated at a specific rotor position of rotor 32". It is not necessary for this purpose that there be a particular event which is detected by rotor position sensor 61 and at which it is recognized that one complete revolution has occurred. Instead, all the events in each revolution of rotor 32" can be identical, since the measurement of complete revolutions is accomplished automatically because of the particular measurement approach using MOD_f.

This measurement approach is similarly suitable for measuring a frequency signal f that is delivered to μC 23 from an external frequency generator. Such signals f may also have asymmetries during one period of frequency f if, for example, a zero transition at half the period is slightly shifted, so that, for example, a measurement using mod 2 or mod 4 may be advantageous and may yield more accurate results.

FIG. 15 shows a rotor 32' having two marks 81 and 82 and rotor position sensor 61, similarly to FIG. 3. Rotor position signal f has events in the form of pulses at points 217, 218, 219, . . . , 228. The pulses are alternatingly generated by white mark 81 and black mark 82 when they rotate past rotor position sensor 61, and are therefore depicted as white and black for better comprehension. In addition, an interference pulse S occurs between pulses 220 and 221. Also depicted are control signals 211, 213, and 215 for requesting a measurement.

Below the pulses, the value of counter N for the number of pulses is indicated in row 232, and the result of the calculation of N mod 2 is shown in row 230.

A measurement normally ends/begins whenever a measurement is requested by a control signal 211, 213, or 215 and additionally the value of N mod 2 is equal to zero, i.e. when rotor 32' has rotated an integral multiple of one revolution since the last measurement.

The effect of interference pulse S is that for the measurement in the period Δt(218–223), it is assumed that rotor 32' has traveled one complete revolution between pulses 220 and 221, although it has completed only half a revolution. As a result, after control signal 213, measurement occurs not at the "white" signal 222 but at the "black" signal 223, since after interference pulse S, N mod 2 now has a value of zero not at the "white" pulses but at the "black" pulses.

Measurement is already proceeding correctly again in the following period t(223–227), however, since now measurement is taking place in each case at "black" pulses. What has occurred as a result of interference pulse S is therefore a shift in the position of rotor 32' at which measurement takes place. The same would be true if a pulse were missing. The measurement method therefore continues to operate correctly after an erroneous signal S, and continues to measure a multiple of a complete revolution. This constitutes an important advantage of this embodiment.

Flow Charts for Measurement of f

Figure 11:
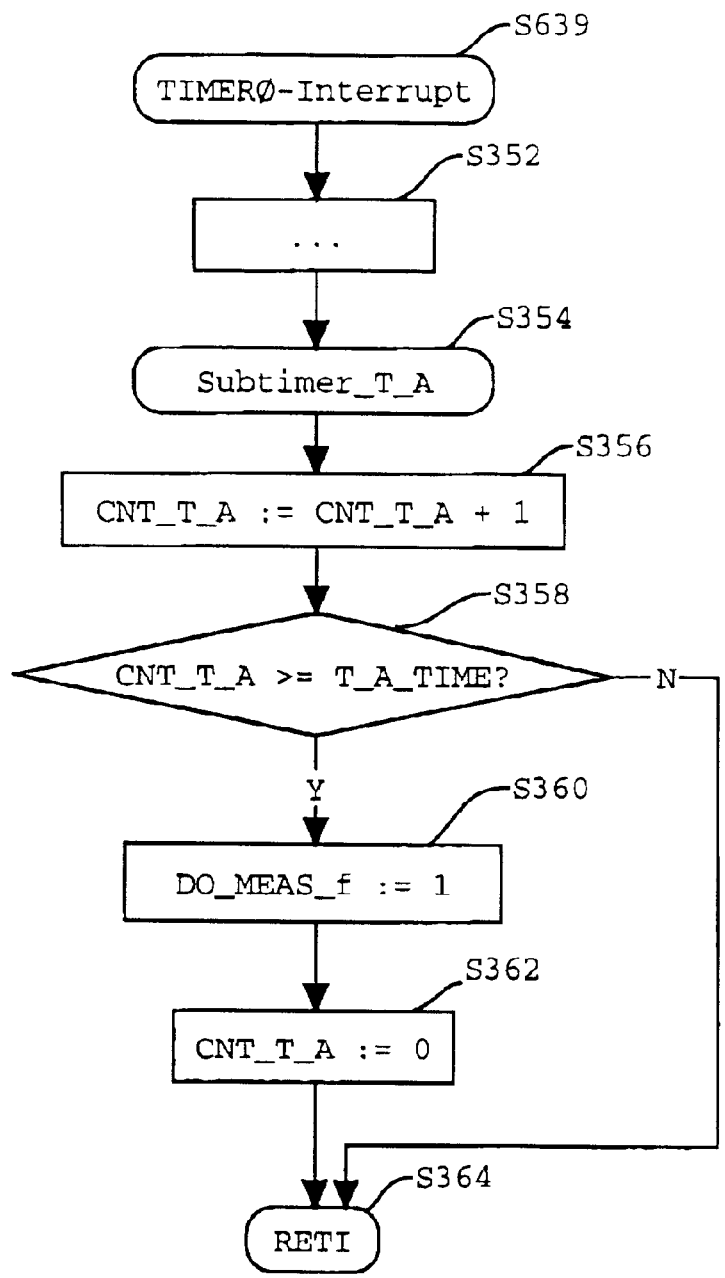
FIG. 11 shows a flow chart for a TIMER0 interrupt function.

FIGS. 11 and 12 show flow charts pertaining to a program for the measurement described in FIGS. 9 and 10.

FIG. 11 shows TIMER0 interrupt routine S639 (FIG. 7) which requests, after each time T_A (FIG. 10), the frequency measurement that subsequently takes place in Hall interrupt routine S631.

The following variables are used:

CNT_T_A Internal counter for time $T_{13}$ A

T_A_TIME Limit value for new measurement

DO_MEAS_f Flag to call the frequency measurement

TIMER0 interrupt routine S639 is performed at every occurrence of a TIMER0 interrupt 638 (FIG. 7).

In S352, any further steps not set forth here are performed, for example if other program sections are to be controlled by timer TIMER0.

A subtimer_T_A begins in S354. "Subtimer" means that as a result of steps S356, S358, and S362 explained below, the actual action in S360 is triggered only after a specific number of TIMER0 interrupts. This has the advantage that timer TIMER0 can also be used for other purposes which need to be called more often.

In S356, internal counter CNT_T_A is incremented by 1.

In S358, a check is made as to whether counter CNT_T_A is greater than or equal to the value T_A_TIME.

If not, execution then branches immediately to end S364, and the TIMER0 interrupt routine is exited with the instruction "RETI."

If, however, it is found in S358 that counter CNT_T_A has reached the value T_A_TIME, then in S360 DO_MEAS_f is set to 1.

DO_13 MEAS_f=1 informs Hall interrupt routine S631 (FIG. 12) that a measurement of frequency f is to be started.

The call in S360 takes place, for example, every 25 ms if the TIMER0 interrupt is triggered every 10 μs and the value of T_A_TIME=2500.

Time T_A must be adapted to the particular motor. For example, if rotor position sensor 61 yields a large number of events with each revolution of rotor 32, and if rotor 32 is rotating quickly, then T_A can be made shorter. If rotor 32 is rotating slowly, however, then T_A must be set longer, for example TA=250 ms.

In S362, counter CNT_T_A is reset to zero so that subtimer Subtimer_T_A can be restarted.

In FIG. 10, S360 is called at points 191, 193, and 195.

FIG. 12 shows an exemplary embodiment of Hall interrupt routine S631 which is executed at each Hall interrupt 630 triggered by the occurrence of an edge 110 (FIG. 4B) of signal f.

A This interrupt is so called because it is usually initiated by the signal of a Hall generator 61 (in motor M 32). Of course it could also be triggered by an optical or mechanical sensor, and it could also be referred to as a sensor-controlled interrupt.

The following variables are used:

| | |
|---|---|
| INT_CNT_f | Interrupt counter for sensing the edges of signal f |
| INC_f | Increment value |
| t_END_f | Instant of the last interrupt of the sensing process |
| MOD_f | Number of interrupts for mod calculation, cf. equations (3) and (3a) |
| t_MEAS_f | Measured time of the last interrupt |
| INT_MEAS_f | Number of measured interrupts since the last measurement |
| DO_MEAS_f | Flag to call the frequency measurement |
| FCT_CALC_n | Function register bit of CALC_n function S616 |

Any desired steps can be performed in S302.

In the case of an electronically commutated motor, Hall interrupt routine S631 provides electronic commutation in COMMUT S304. This is omitted in the case of a collector motor.

Sensing and measurement of signal f begins in MEAS_f S320. In S322, interrupt counter INT_CNT_f—which is, for example, 1 byte long—is incremented by the value INC_f, e.g. INC_f=1, and the value t_TIMER1 of ring counter TIMER1 is stored in t_END_f. Thus both the number of interrupts and the instantaneous time are sensed.

In S324, INT_CNT_f mod MOD_f=0 is used to check whether the value in interrupt counter INT_CNT_f is a multiple of MOD_f. If MOD_f=4, for example, INT_CNT_f=20 is a multiple of MOD_f, i.e. 20 mod 4=0. If INT_CNT_f is not a multiple of MOD_f, then execution branches to end S334 of the interrupt routine. If INT_CNT_f is a multiple of MOD_f, then a check is made in S326 as to whether DO_MEAS_f=1, i.e. whether a measurement of frequency f was requested in step S360 of TIMER0 interrupt routine S639 (FIG. 11). If not, then no measurement needs to be made yet, and execution branches to end S334. If so, then in S328 a check is made on the basis of function register bit FCT_CALC_n as to whether the last rotation speed calculation is already complete. If FCT_CALC_n=1, then execution branches to end S334. This prevents measurements from being lost if rotation speed calculation function CALC$_{13}$ n S616 requires too much time. This special situation does not occur in normal operation.

In S330, variables t_MEAS_f and INT_MEAS_f are set, and are transmitted to rotation speed calculation function CALC_n S616 that is described with reference to FIG. 13.

For this purpose, t_MEAS_f is set to the most recently sensed timer value t_END_f of ring counter TIMER1, INT_MEAS_f is set to the value of interrupt counter INT_CNT_f, and INT_CNT_f is reset to zero.

In S332, rotation speed calculation function CALC_n S616 (FIG. 13) is requested by setting FCT_CALC_n to 1, and the measurement request is reset by resetting DO_MEAS_f to zero.

TIMER0 interrupt routine S639 (FIG. 11) and Hall interrupt routine S631 (FIG. 12) thus together bring about a frequency measurement as described in FIG. 9. If μC 23 cannot manage the mod operation, there are other possibilities.

In many μCs, an integral division with the instruction "div" yields as its result both the integral quotient and the nonnegative remainder. For example, 7 div 4 yields as its result a quotient 1 and remainder 3. With PCs of this kind, the div operation can be used to calculate the remainder, and measurement, then occurs only at instants at which the remainder has the same value.

Another possibility for calculating X mod MOD_f involves, for example, the use of a further variable MOD_CNT, which is also incremented each time variable X is incremented, and which is reset to zero when MOD_f is reached. The MOD_CNT variable then indicates the result of X mod MOD_f.

FIG. 13 shows the routine CALC_n S616 that is requested by the Hall interrupt routine (S332 in FIG. 12) after measuring timer value t$_{13}$ MEAS$_{13}$ f and the number of edges 110 (FIG. 4) of signal f in INT_MEAS_f.

The following variables are used:

| | |
|---|---|
| Δt_CALC_f | Time difference since last measurement |
| t_OLD_f | Instant of last measurement |
| t_MEAS_f | Instant of present measurement |
| INT_CALC_f | Number of interrupts since last measurement for the calculation |
| INT_MEAS_f | Transferred number of interrupts since the last measurement |
| n | Rotation speed of motor M |
| REM_n | Remainder of integral division |
| const_f | Factor for parameterization of INT_CALC_f |
| REM_n_OLD | Remainder resulting from integral division of last calculation |

In S370, the difference between timer value t_OLD_f of the last measurement and the present timer value t_MEAS_f is calculated and is stored in variable Δt_CALC_f, which corresponds to the value Δt_MEAS_f of FIG. 10.

With ring counters, the difference is usually calculated using the two's complement. The present timer value t_MEAS_f is then stored for the next measurement in t_OLD_f, and the measured number of interrupts INT_MEAS_f is stored in INT_CALC_f.

In S372, rotation speed n is calculated. It is proportional to the quotient of the number of interrupts INT_CALC_f (an indication of the number of revolutions) and the time $\Delta t\_CALC\_f$ required for them. The applicable equation is:

$$n = const\_f * INT\_CALC\_f / \Delta t\_CALC\_f \quad (5)$$

where $const\_f$ is a proportionality constant.

Interrupt counter $INT\_CALC\_f$—which in this exemplary embodiment is, for example, 4 bytes long—is multiplied by $const\_f$.

Constant $const\_f$ can be selected so that the result of the division in S372 makes optimum use the range of value n, which for example is two bytes or 16 bits long. This can be achieved, for example, by selecting $const\_f$ such that when the number of pulses at maximum rotation speed is divided by measurement window time $T\_A$, the rotation speed assumes a value of approximately $2^{15}$ (if the value of n is 16 bits). This yields high accuracy, but rotation speed n does not correspond to rotation speed $n_{13}$ phys measured in RPM.

If rotation speed n must correspond to rotation speed n_phys measured in RPM, then $const\_f$ must be defined as $$const\_f = 60 * TF / MOD\_f \quad (6)$$

where TF is a time factor constituting the reciprocal of the time unit of ring counter TIMER1 in seconds. For example, if the time unit of timer TIMER1 is 1 $\mu S = 10^{-6}$ S, then TF is set at $10^6$. For a four-pole motor M with $MOD_{13}$ f=4 and $TF=10^6$, the result is, for example, $const\_f = 15,000,000$.

An integral division div, which produces as its result the integral quotient n and positive remainder $REM\_n$, is used to calculate rotation speed n. For a description of the div operator, cf. the explanations of FIG. 10.

A calculation of the rotation speed for the region between points 197 and 199 in FIG. 10 is shown below as an example:

$INT\_MEAS\_f$ is one byte long, $INT\_CALC\_f$ four bytes, and $t\_CALC\_f$ two bytes.

$INT\_MEAS\_f(197-199)$ has a value of 8, i.e. eight edges 110 of the Hall signal (FIG. 10A) have been counted since the last measurement at instant $t\_MEAS\_f(197)$. In S370, $INT\_CALC\_f$ has assigned to it the value $INT\_MEAS\_f(197-199) = 8$. In S372, $INT\_CALC\_f$ is multiplied by $const\_f = 15,000,000$, and acquires the value 120,000,000.

The value of $\Delta t\_MEAS\_f(197-199)$ is, for example, 26,700, which corresponds (if ring counter TIMER1 has a resolution of 1 $\mu s$) to a time of 26.7 ms. In S370, $\Delta t\_CALC\_f$ has assigned to it the value $\Delta t_{13}$ $MEAS_{13}$ $f(197) = 26,700$.

Dividing $INT_{13}$ $CALC\_f$ by $\Delta t\_CALC\_f$ yields a rotation speed n=4494 and a remainder REM n=10,200.

The "physical" rotation speed n_phys corresponds to the number of revolutions per minute. Eight Hall transitions divided by 4 Hall transitions per revolution (four-pole rotor) equals two revolutions, and the time required for them is 0.0267 s. This yields a physical rotation speed n_phys=2/0.0267=74,906 revolutions per second=4494.4 RPM.

The calculation also takes into account the remainder $REM\_n\_OLD$ of the previous rotation speed calculation, by addition to the product of $INT\_CALC\_f$ and $const\_f$.

In the above example, for instance, the calculated rotation speed n exhibits a discrepancy because division yields the integer 4494 rather than the actual result of approx. 4494.4. The difference is not lost, however, but rather is taken into account during the next division in S372 by adding remainder $REM\_n\_OLD$ of the last division to the numerator.

The advantageous result of taking into account remainder $REM\_n\_OLD$ is that no information is lost, and there is a measurable improvement in the controller, if one is used.

After the calculation of n and $REM\_n$, in S372 remainder $REM\_n$ is stored in $REM\_n\_OLD$ for the next calculation.

In S374, function register bit $FCT\_CALC\_n$ (FIG. 8; FIG. 12, S332) is reset to zero because the rotation speed calculation is complete, and the controller function is requested with $FCT\_RGL=1$.

Execution then branches back to the beginning S602 of the function manager (FIG. 7).

Controller Function RGL

FIG. 14 shows, as an example, a flow chart for an exemplary embodiment of controller function RGL S620 (FIG. 7) that calculates, from rotation speed n and from a desired rotation speed $n_{13}$ s, a control output $RGL\_VAL$ which it then outputs.

The following variables are used:

| | |
|---|---|
| RGL_DIFF | System deviation |
| RGL_PROP | Proportional component |
| RGL_P | Proportional factor |
| RGL_INT | Integral component |
| RGL_I | Integral factor |
| RGL_VAL | Control output calculated by controller |
| RGL_MAX | Maximum control output |

In S530, system deviation RGL_DIFF is calculated as $$RGL\_DIFF = n_{13} \, s_{13} \, n \quad (7)$$

S532 represents a PI controller.

Proportional component RGL_PROP is calculated by multiplying system deviation RGL_DIFF by proportionality factor RGL_P.

The new integral component RGL_INT is calculated by adding the previous integral component to system deviation RGL_DIFF multiplied by integral factor RGL_I. Integral component RGL_INT preferably has sufficient memory available to it that no system deviation information is lost.

Control output RGL VAL is obtained from the sum of proportional component RGL_PROP and integral component RGL_INT.

In steps S534 through S540, a range check of control output RGL_VAL is performed.

If control output RGL_VAL in S534 is less than zero, then it is set to zero in S536.

If control output RGL_VAL in S538 is greater than the maximum permissible value RGL_MAX, then it is set to RGL_MAX in S540.

If the value of RGL_VAL lies within a permissible range, it is used unchanged.

In S542, register SW of a $\mu C$-internal D/A converter is set to the value of control output RGL_VAL, and signal SW is output to actuator 63.

Controller function S620 has thus been performed, and function register bit FCT_RGL is reset in S544. Execution then branches back to start S602 of the function manager (FIG. 7).

Many modifications and variants are of course possible within the context of the present invention. For example, the present invention can also be used in the context of other controllers, or even without a controller, for measurement of a rotation speed or a frequency that is delivered in the form of a pulse train. The invention was described in conjunction with an electric motor because that constitutes a preferred application, but it is suitable in identical fashion for internal combustion engines, turbines, etc.

What is claimed is:

1. A method for obtaining a datum concerning the rotation speed of a rotating object, hereinafter called a rotor, associated with which is a sensor which supplies a sensor signal that has, for each revolution of the rotor, a plurality A of events comprising pulses or edges, said method comprising the following steps:
   a) at a first instant, the measurement of the rotation speed datum is initiated;
   b) a second instant, at which an event of the sensor signal following the first instant occurs, is ascertained;
   c) the number of subsequent events of the sensor signal is sensed;
   d) at a third predefined instant, termination of the measurement of the rotation speed datum is initiated;
   e) a fourth instant is ascertained, at which, after the third predefined instant, the number of events since the second instant is equal to $a*A$, where $a=1, 2, 3, \ldots$, and A=number of events per complete revolution of the motor; and
   f) the rotation speed datum is calculated from the time interval ($\Delta t$) between second instant and fourth instant and from the number of events sensed up to the fourth instant.

2. The method as defined in claim 1, in which successive measurements follow one another without interruption.

3. The method as defined in claim 2, in which the first instants of successive measurements are at predefined time intervals (T_A).

4. The method as defined in claim 1, in which several measurements are performed and the third predefined instant of each measurement is at a substantially constant time interval (T_A) from the first instant of that measurement.

5. The method as defined in claim 2, in which the third predefined instant of a measurement corresponds to the first instant of a measurement subsequent thereto.

6. The method as defined in claim 5, in which the fourth instant of a measurement corresponds to the second instant of a measurement subsequent thereto.

7. The method as defined in claim 1, in which in ascertaining a rotation speed datum, a division is performed between a value proportional to the number of events sensed up to the fourth instant, and a value proportional to the time period between the second and fourth instants.

8. The method as defined in claim 7, in which the rotation speed datum is parameterized by multiplication by a constant factor.

9. The method as defined in claim 1, in which, beginning with the event that occurs at the second instant, the value of the ordinal number (N) of the event modulo $b*A$ is calculated, and the measurement duration ($\Delta t$) between events at which the value of (ordinal number of the event modulo $b*A$) is the same is sensed; where A=number of events per revolution of the rotor, and b=1, 2, 3.

10. The method according to claim 7, in which, when a division between the value proportional to the number of events sensed and a value proportional to the time period between the second and fourth instants yields as the result an integral rotation speed datumn and a remainder, that remainder is taken into account by addition to the numerator of the measurement subsequent thereto.

11. A method of obtaining a datum concerning the rotation speed of a rotating object, hereinafter called a rotor, associated with which is a sensor which supplies a sensor signal that has, for each revolution of the rotor, a fixed plurality A of events, said method comprising the following steps:
   a) a measurement duration ($\Delta t$) is measured between an event having the ordinal number $0$ (N=0) and an event subsequent thereto having the ordinal number $a*A$ (N=$a*A$), the plurality A being predefined and a being an integer of the series 1, 2, 3, . . . ;
   b) by division between a value proportional to the number A and a value proportional to the measurement duration ($\Delta t$), the rotation speed datum (n) and a remainder (REM_n) resulting from the division are generated;
   c) beginning from the event having the ordinal number $a*A$, a second measurement of the same kind is performed;
   d) when the second measurement is evaluated, the aforesaid remainder ($REM_{13}$ n) is taken into account by addition to the numerator.

12. The method as defined in claim 11, in which the number of events during one complete revolution of the rotor is used as number A.

13. The method as defined in claim 11, in which, beginning with the event that occurs at the second instant, the value of the ordinal number (N) of the event modulo $b*A$ is calculated, and the measurement duration ($\Delta t$) between events at which the value of (ordinal number of the event modulo $b*A$) is the same is sensed; where A=number of events per revolution of the rotor, and b=1, 2, 3.

14. An apparatus for obtaining a datum concerning the rotation speed of a rotating object, hereinafter called a rotor (32; 32', 32"), comprising
   a sensor (61) which supplies a sensor signal (f) that has, for each revolution of the rotor, a fixed plurality A of events (110).
   a source (23) for control signals (191, 193, 195); a counter ($INT_{13}$ $CNT_{13}$ f) for events (110) of the sensor signal (f);
   a program-controlled apparatus (23) for analyzing the aforesaid signals, associated with which apparatus is a program that is configured to perform the following steps:
   a) by way of a first control signal (191), the measurement of the rotation speed datum is initiated;
   b) a first instant (197), at which an event (110) of the sensor signal (f) following the first control signal occurs, is ascertained;
   c) the number of subsequent events (110) of the sensor signal (f) is sensed by the counter ($INT_{13}$ $CNT_{13}$ f);
   d) by way of a second control signal (193), termination of the measurement of the rotation speed datum is initiated;
   e) a second instant (199) is ascertained, at which an event of the sensor signal (f) occurs that follows the second control signal (193) and at which the number of subsequent events (110) sensed by the counter ($INT_{13}$ CNT_f) is integrally divisible by the value A; and
   f) the rotation speed datum is calculated from the time interval between first instant (197) and second instant (199), and from the number of events of the sensor signal (f) sensed up to the second instant (199).

15. The apparatus as defined in claim 14, in which the source of the control signals comprises a timer (TIMER0).

16. The apparatus as defined in claim 15, in which the timer (TIMER0) triggers an interrupt (TIMER0 interrupt) in each case as the control signal.

17. The apparatus as defined in claim 14, in which a timer (TIMER1) is provided for measuring the time interval between the first and second instants.

18. The apparatus as defined in claim 17, in which the timer (TIMER1) for measuring the time interval between the first and second instants comprises as a ring counter.

19. The apparatus as defined in claim 18, in which the ring counter (TIMER1) counts continuously, and the second instant of a completed measurement coincides with the first instant of a new measurement.

20. The apparatus according to claim 14, in which rotor position signals from a sensor of an electronically commutated motor serve as the sensor signals.

21. The apparatus as defined in claim 14, in which the counter (INT_CNT_f) for events (119) of the sensor signal (f) is provided in the program-controlled apparatus (23).

22. A method of ascertaining a frequency from a signal (f) that manifests recurring events comprising pulses or edges, said method comprising the following steps:
   a) at a first instant, the measurement of the frequency is initiated;
   b) a second instant is ascertained, at which a frequency datum of the signal (f) following the first instant occurs;
   c) the number of frequency data of the signal following the second instant is continuously sensed;
   d) at a third predefined instant, termination of the measurement of the frequency is initiated;
   e) a fourth instant is ascertained, at which a frequency datum of the signal that follows the third predefined instant occurs and at which the number of frequency data since the second instant corresponds to a value a*A, wherein
   a=1, 2, . . . , and
   A=2, 3, . . . ;
   f) a variable characterizing the frequency is calculated from the time interval between second instant and fourth instant and from the number of frequency data of the signal sensed up to the fourth instant.

23. The method as defined in claim 22, in which measurements are performed continuously, and the third predefined instant of a measurement is in each case at a substantially constant time interval from the first predefined instant of that measurement.

24. The method as defined in claim 23, in which the third instant of a measurement corresponds to the first instant of a subsequent measurement.

25. The method as defined in claim 23, in which the fourth instant of a measurement corresponds to the second instant of a subsequent measurement.

26. The method as defined in claim 22, in which, beginning with the event that occurs at the second instant the value of the ordinal number (N) of the events that occur is calculated modulo b*a; and
   the time interval (Δt) between events at which the ordinal number of the event modulo b*a has the same value is ascertained, b being an integer of the series 1, 2, 3.

* * * * *

UNITED STATES PATENT AND TRADEMARK OFFICE
CERTIFICATE OF CORRECTION

PATENT NO. : 6,496,786 B1
DATED : December 17, 2002
INVENTOR(S) : Dieterle et al.

It is certified that error appears in the above-identified patent and that said Letters Patent is hereby corrected as shown below:

Column 9,
Line 14, "CAL$_{13}$Cn" should be -- CALC_n --.

Column 10,
Lines 7 and 8, "t_MEAS f" should be -- t_MEAS_f --.

Column 12,
Line 54, "T$_{13}$A" should be -- T_A --.

Column 13,
Line 10, "DO$_{13}$MEAS_f=1" should be -- DO_MEAS_f=1 --.
Line 28, "A" should be deleted.
Line 45, -- (FIGS. 7 and 8) -- should be inserted.

Column 14,
Line 6, "CALC$_{13}$n" should be -- CALC_n --.
Line 28, "PCs" should be -- $\mu$Cs --.
Line 39, "t$_{13}$MEAS$_{13}$f" should be -- t_MEAS_f --.

Column 15,
Line 17, "n$_{13}$phys" should be -- n_phys --.
Line 25, "MOD$_{13}$f=4" should be -- MOD_f=4 --.
Lines 46 and 47, "$\Delta$t$_{13}$MEAS$_{13}$f(197)" should be -- $\Delta$t_MEAS_f(197) --.
Line 48, "INT$_{13}$CALC_f" should be -- INT_CALC_f --.

Column 16,
Line 14, "n$_{13}$s" should be -- n_s --.
Line 30, "n$_{13}$s$_{13}$n" should be -- n_s_n --.
Line 40, "RGL VAL" should be -- RGL_VAL --.

UNITED STATES PATENT AND TRADEMARK OFFICE
CERTIFICATE OF CORRECTION

PATENT NO.    : 6,496,786 B1
DATED         : December 17, 2002
INVENTOR(S)   : Dieterle et al.

It is certified that error appears in the above-identified patent and that said Letters Patent is hereby corrected as shown below:

Column 18,
Line 12, after "performed" -- and -- should be inserted.
Line 14, "($REM_{13}n$)" should be -- ($REM\_n$) --.
Line 34, "($INT_{13}CNT_{13}f$)" should be -- ($INT\_CNT\_f$) --.
Line 46, "($INT_{13}CNT_{13}f$)" should be -- ($INT\_CNT\_f$) --.
Line 54, "($INT_{13}CNT\_f$)" should be -- ($INT\_CNT\_f$) --.

Column 20,
Line 2, after ";" -- and -- should be inserted.

Signed and Sealed this

Twenty-ninth Day of July, 2003

JAMES E. ROGAN
*Director of the United States Patent and Trademark Office*